United States Patent
Posa et al.

(10) Patent No.: US 7,283,788 B1
(45) Date of Patent: Oct. 16, 2007

(54) REMOTE MICROPHONE TELECONFERENCING CONFIGURATIONS

(76) Inventors: John G. Posa, 1204 Harbrooke Ave., Ann Arbor, MI (US) 48103; Barry H. Schwab, 5298 Cedarhurst Dr., West Bloomfield, MI (US) 48322

( * ) Notice: Subject to any disclaimer, the term of this patent is extended or adjusted under 35 U.S.C. 154(b) by 1281 days.

(21) Appl. No.: 09/625,531

(22) Filed: Jul. 26, 2000

(51) Int. Cl.
*H04M 1/00* (2006.01)
*H04B 1/38* (2006.01)
*H04B 7/00* (2006.01)

(52) U.S. Cl. ............... 455/41.2; 455/90.2; 455/575.2; 455/416; 348/14.09; 348/169

(58) Field of Classification Search ............... 455/41, 455/575, 90, 403, 414, 416, 550, 90.2, 90.3, 455/575.1, 575.2, 550.1, 41.2, 566–569.1; 348/14.02, 14.08, 14.09, 169
See application file for complete search history.

(56) References Cited

U.S. PATENT DOCUMENTS

| | | | |
|---|---|---|---|
| 4,239,356 A | 12/1980 | Freudenschuss et al. ...... 354/23 |
| 4,290,685 A | 9/1981 | Ban ........................... 354/266 |
| 4,534,629 A | 8/1985 | Bogle et al. ................. 352/140 |
| 4,550,343 A | 10/1985 | Nakatani .................... 358/229 |
| 4,601,557 A | 7/1986 | Bogle et al. ................. 352/140 |
| 4,636,052 A | 1/1987 | Bowsher ..................... 354/410 |
| 4,816,855 A | 3/1989 | Kitaura et al. .............. 354/415 |
| 4,831,438 A | 5/1989 | Bellman, Jr. et al. ....... 358/108 |
| 4,884,094 A | 11/1989 | Kitaura et al. .............. 354/412 |
| 4,918,476 A | 4/1990 | Tejima ........................ 354/221 |
| 4,928,179 A | 5/1990 | Takahashi et al. .......... 358/210 |
| 4,980,871 A | 12/1990 | Sieber et al. ................ 367/127 |
| 5,012,335 A | 4/1991 | Cohodar ..................... 358/108 |
| 5,038,162 A | 8/1991 | Tejima ........................ 354/221 |
| 5,076,686 A | 12/1991 | Preston ....................... 352/140 |
| 5,092,670 A | 3/1992 | Preston ....................... 352/140 |
| 5,159,375 A | 10/1992 | Taniguchi et al. .......... 354/400 |
| 5,172,155 A | 12/1992 | Kosaka ....................... 354/403 |
| 5,179,421 A | 1/1993 | Parker et al. ............... 356/152 |
| 5,206,721 A | 4/1993 | Ashida et al. ................ 358/85 |
| 5,231,483 A | 7/1993 | Sieber et al. ............... 358/125 |
| 5,268,734 A | 12/1993 | Parker et al. ............... 356/152 |
| 5,283,610 A | 2/1994 | Sasaki ......................... 396/57 |
| 5,361,115 A | 11/1994 | Ohtsuka et al. ............. 354/400 |
| 5,384,594 A | 1/1995 | Sieber et al. ............... 348/169 |
| 5,387,955 A | 2/1995 | Cocca ......................... 396/56 |
| 5,432,597 A | 7/1995 | Parker et al. .......... 356/139.06 |
| 5,471,296 A | 11/1995 | Parker et al. .......... 356/139.06 |

(Continued)

*Primary Examiner*—Edan Orgad
(74) *Attorney, Agent, or Firm*—Gifford, Krass, Sprinkle, Anderson & Citkowski, PC

(57) ABSTRACT

Electronic teleconferencing configurations use one or more remote microphones for added functionality. A base unit includes an interface to a telecommunications network and at least one remote microphone in wireless communication with the base unit, enabling a carder of the microphone to speak to a listener through the base unit over the telecommunications network. The base unit may form part of a telephone, and would preferably further include a docking station to receive the remote microphone along with electrical contacts causing the telephone to enter into a speakerphone mode when the remote microphone is removed for use. A speaker may either be provided in the base unit, or may be disposed in the housing of the remote microphone, for example, in the form of a headset. With multiple wireless microphones audio processing circuitry may be added for level control or microphone/speaker discrimination.

12 Claims, 5 Drawing Sheets

U.S. PATENT DOCUMENTS

| | | |
|---|---|---|
| 5,512,941 A | 4/1996 | Takahashi et al. ............. 348/81 |
| 5,570,177 A | 10/1996 | Parker et al. .......... 356/139.06 |
| 5,572,317 A | 11/1996 | Parker et al. .......... 356/139.06 |
| 5,594,498 A | 1/1997 | Fraley ........................ 348/158 |
| 5,995,763 A | 11/1999 | Posa et al. |
| 6,069,943 A * | 5/2000 | David et al. ............ 379/202.01 |
| 6,321,080 B1 * | 11/2001 | Diethorn ..................... 455/416 |
| 6,336,031 B1 * | 1/2002 | Schyndel ..................... 455/41 |
| 6,424,369 B1 * | 7/2002 | Adair et al. ................... 348/76 |
| 6,469,732 B1 * | 10/2002 | Chang et al. ............ 348/14.08 |
| 6,473,629 B1 * | 10/2002 | Chang ........................ 455/566 |
| 6,564,380 B1 * | 5/2003 | Murphy ....................... 725/86 |
| 6,640,239 B1 * | 10/2003 | Gidwani ..................... 709/203 |
| 6,731,334 B1 * | 5/2004 | Maeng et al. .......... 348/211.12 |
| 7,057,636 B1 * | 6/2006 | Cohen-Solal et al. .... 348/14.08 |
| 2003/0050011 A1 * | 3/2003 | Palermo et al. ................ 455/41 |

* cited by examiner

REMOTE MICROPHONE TELECONFERENCING CONFIGURATIONS

FIELD OF THE INVENTION

This invention relates generally to telecommunications and, in particular, to audio and video telecommunications apparatus incorporating wireless microphones for added capabilities.

BACKGROUND OF THE INVENTION

Increasingly, telecommunications equipment is being operated in a hands-free manner. Even in the case of the common office telephone, an increasing number of units include a speakerphone capability. Video teleconferencing equipment also ordinarily provides one or more table-top microphones used to pick up the audio associated with the various participants.

There are at least two problems associated with current equipment operated in a hands-free manner. First, those on the other end of the line are usually aware that a speakerphone is being used due to the poor, echo-like quality of the sound. This disturbs some people to the point that some individuals will ask that they be taken off of the "squawk box." A second problem is that those on the sending end never really know how their voices sound, and this causes users to get close to, or even shout into, the microphone.

SUMMARY OF THE INVENTION

This invention resides in electronic teleconferencing configurations incorporating one or more remote microphones for added functionality. Broadly, the invention includes a base unit having an interface to a telecommunications network, and at least one remote microphone in wireless communication with the base unit, enabling a carrier of the microphone to speak to a listener through the base unit over the telecommunications network.

In one embodiment, the base unit forms part of a telephone, and further includes a docking station to receive the remote microphone. The base unit preferably further includes a set of electrical contacts between the remote microphone and the base unit and a switch in electrical communication with the switch means, causing the telephone to enter into a speakerphone mode when the remote microphone is removed from the docking station for use. A speaker may either be provided in the base unit, or may be disposed in the housing of the remote microphone, for example, in the form of a headset.

A more complex embodiment would include a plurality of remote microphones, along with audio processing circuitry operative to deliver the signals to a remote participant through the telecommunications network interface. The audio processing circuitry may include a level control, causing the volume associated with each microphone to appear uniform to the listener, or may include discrimination circuitry operative to selectively pass the audio from a subset of the microphones based upon current usage. Such discrimination may be based upon separate carrier frequencies or, if a common carrier frequency is used, packetized header information.

The telecommunications apparatus of the invention may also form part of a video teleconferencing system, in which case one or more cameras would be employed to capture user images for transmission through the telecommunications network. As a further option, the system may transmit a wireless signal for transponding by the remote units, enabling the determination of distance to the base unit. In this embodiment, a series of acoustic pulses are preferably broadcast to each active microphone, which is relayed back to the base unit to determine distance based upon time-of-flight.

Particularly with the use of separate frequencies, the location of each remote microphone may also be determined using multiple antennas and triangulation. By knowing distance and/or position, additional capabilities are possible by virtue of the invention. For example, with the addition of a pan/tilt mount, a camera may be automatically pointed at a user while speaking. With distance information, the camera may be zoomed to include one or more subjects and/or auto-focused. Subject framing and/or depth-of-field also be adjustable as a function of distance.

DETAILED DESCRIPTION OF THE INVENTION

Broadly, this invention adds remote or wireless microphones to various pieces of telecommunications equipment which, in turn, adds additional capabilities described elsewhere herein. In particular, by giving users of hands-free phones and video teleconferencing apparatus their own, dedicated wireless microphone, features such as more advanced discrimination/mixing, focusing and pan-zoom may be added, depending upon the embodiment.

Figure 1:
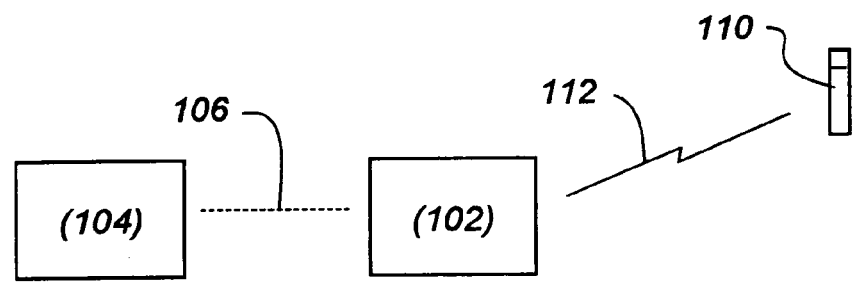
FIG. 1 is a block diagram of a preferred embodiment of the invention.

A basic arrangement according to the invention is shown in FIG. 1. A base unit communicates to a remote user 104 through some form of communication link 106, which may be any public or private connection whatsoever, whether analog, digital, packetized or otherwise, and utilizing any medium, including wired, optical, microwave, RF, and so forth. Interfaced to the base unit 102 is at least one wireless microphone 110, which transmits to the base unit 102 through path 112 which, again, may be implemented in any medium, including RF, optical, or even ultrasonic. In the preferred embodiment, for reasons discussed below, the path 112 comprises an RF carrier frequency.

Figure 2:
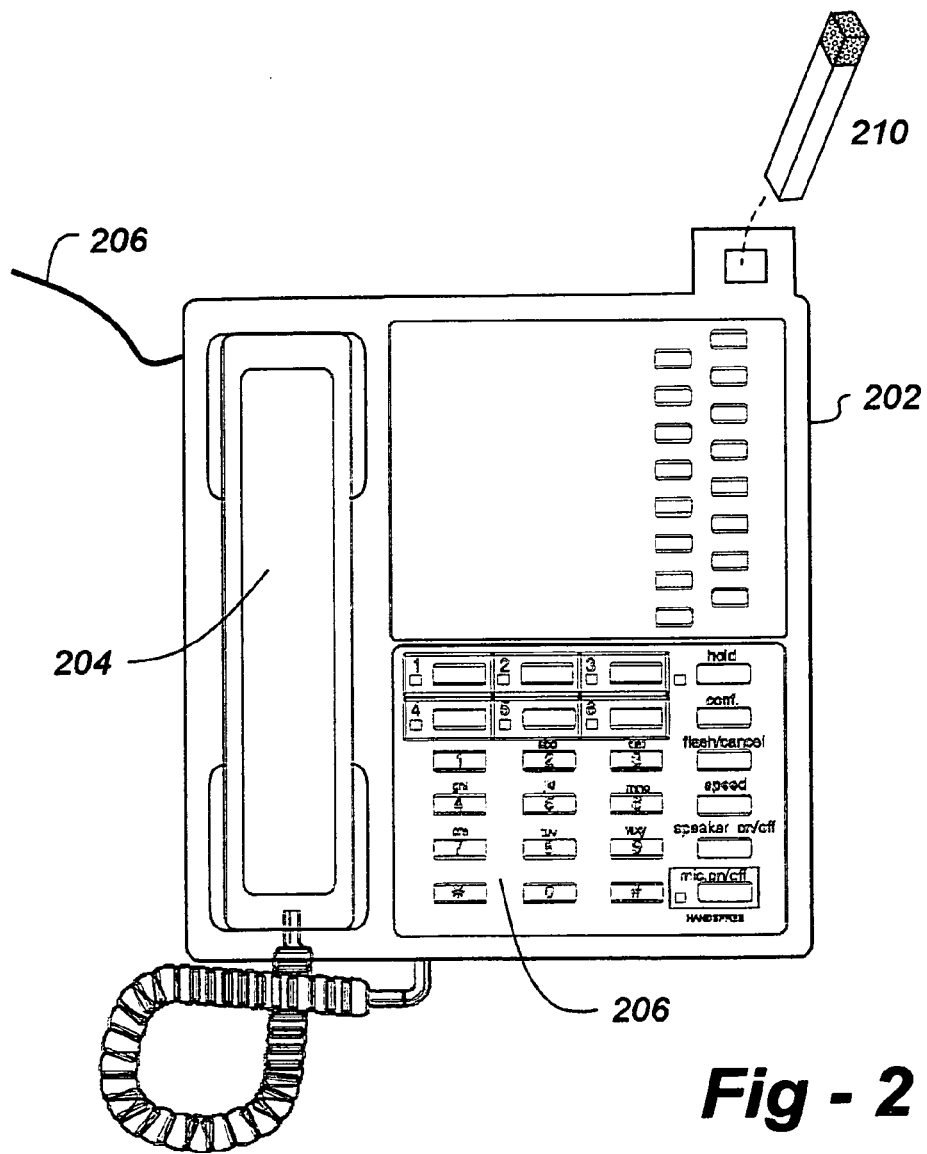
FIG. 2 is a drawing of a telephone-based embodiment of the invention including a docking station to receive a wireless microphone.

Given the introduction with reference to FIG. 1, a basic implementation of the invention takes the form of a telephone shown in FIG. 2. The base unit in this case is the base unit of the phone, having a cradle to receive a handset 204. A wired or wireless connection 206 leads from the base unit 202 to the telephone network, whether through a private or public PBX.

A remote microphone 210 is contained by the base unit 202 in some form of cradle or holster in the preferred embodiment. When the remote microphone 210 is removed, a user may place the unit in a pocket or clip the unit to a lapel, etc., with audio then being picked up and transmitted to the base unit, as shown in FIG. 1. Although a separate switch may be provided to activate the microphone 202, in the preferred embodiment contacts within the holster are provided such that when the microphone is removed, the unit automatically goes into a hands-free or speaker-phone mode. Thus, with the unit 210 removed, not only is the handset 204 deactivated and audio wirelessly transmitted to the base unit, but a speaker 206 is also activated in the base unit 202, so that the user can hear sound originating at the remote end.

As an alternative to the speaker 206, the unit 210 may include its own speaker, or it may be provided in the form of a headset, in which case the communication between unit 210 and the base unit 202 would be two-way. In that the unit 210 would need to be battery operated, in the preferred embodiment, a holster is used with additional contacts enabling the battery within the unit 210 to be recharged while the equipment is not in the hands-free or speaker-phone mode.

Although the basic embodiment of FIG. 2 only includes one microphone, it would at least prevent or minimize the poor echo-like quality generally associated with speaker phones, enabling a phone user to communicate in a hands-free manner without the person on the other end knowing that the phone is in the speaker phone mode. Audio quality would also be more uniform and high in fidelity overall. In this embodiment, and in conjunction with the others disclosed herein, the signal received from the remote unit 210 would be monitored, and some form of alarm would optionally be provided on the unit 210 to let the user thereof know that signal quality is degraded. This could serve several purposes. First, the degraded signal quality may be an indication that the battery in the unit 210 is being depleted, in which case the user might wish to return it to the base unit and use the handset. Alternatively, the signal quality may be degraded due to excessive distance from the base unit 202, reminding the user that he or she should remain closer to the base unit 202, or in the same room. Thus, such an alarm, which may be audible, visible, or both, could also be used to make sure that individuals removing the unit 210 do not simply leave the room and forget to return the unit to the base unit at the conclusion of a conversation.

Figure 3:
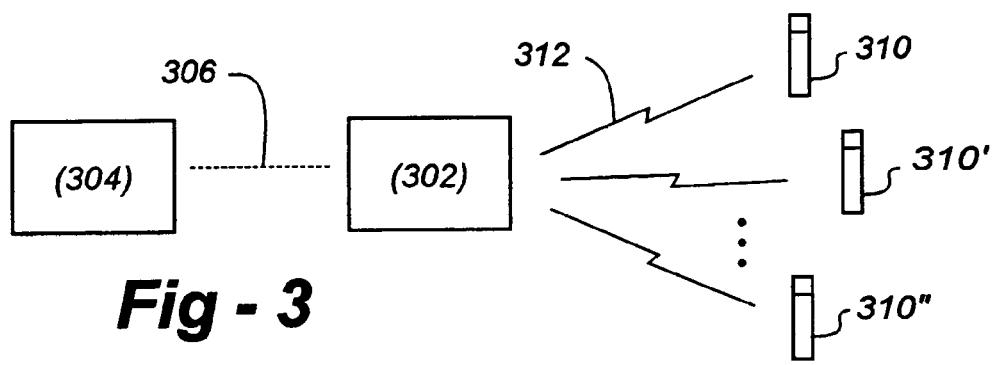
FIG. 3 is a block diagram of an embodiment of the invention utilizing multiple wireless remote microphones.

FIG. 3 is a drawing of a somewhat more complex embodiment of the invention, wherein a plurality of wireless microphones 310, 310' and 310" transmit wireless audio signals 312 to a base unit 302. Again, this base unit is presumed to be in communication with a remote participant 304 through some form of communication link 306. In the embodiment of FIG. 3, the base unit 302 must be somewhat more sophisticated, in that functions such as received signal discrimination, mixing, and/or level control may be required. In the simplest version of this embodiment, all of the remote microphones could simply transmit on the same frequency, with perhaps some level control being provided; in this case the listener on the receiving end would have to sort out the collective speech generated at the sending end. This is no worse than with existing conference calls using multiple participants in a speaker phone mode and, in fact, given the improved audio with reduced echo made possible by the remote microphones, an improvement in sound quality would be realized even in this basic version.

Preferably, however, the base unit 302 would include some capability for discriminating among the various remote microphones, not only to provide level control or other audio mixing functions, but in addition, with the base unit 302 knowing which microphone or microphones are sending an audio signal at a given time, a single speaker may be locked in, or others locked out, until a predetermined period of silence has occurred, thereby ensuring that the conversation delivered to the remote end is less confusing and more intelligible. Such discrimination may be accomplished in different ways according to the invention, including the use of separate carrier frequencies for each remote or, if the same carrier frequency is used, the signals from each microphone may be identified with header information, enabling the base unit to discern separate signals from different remote units.

Figure 4:
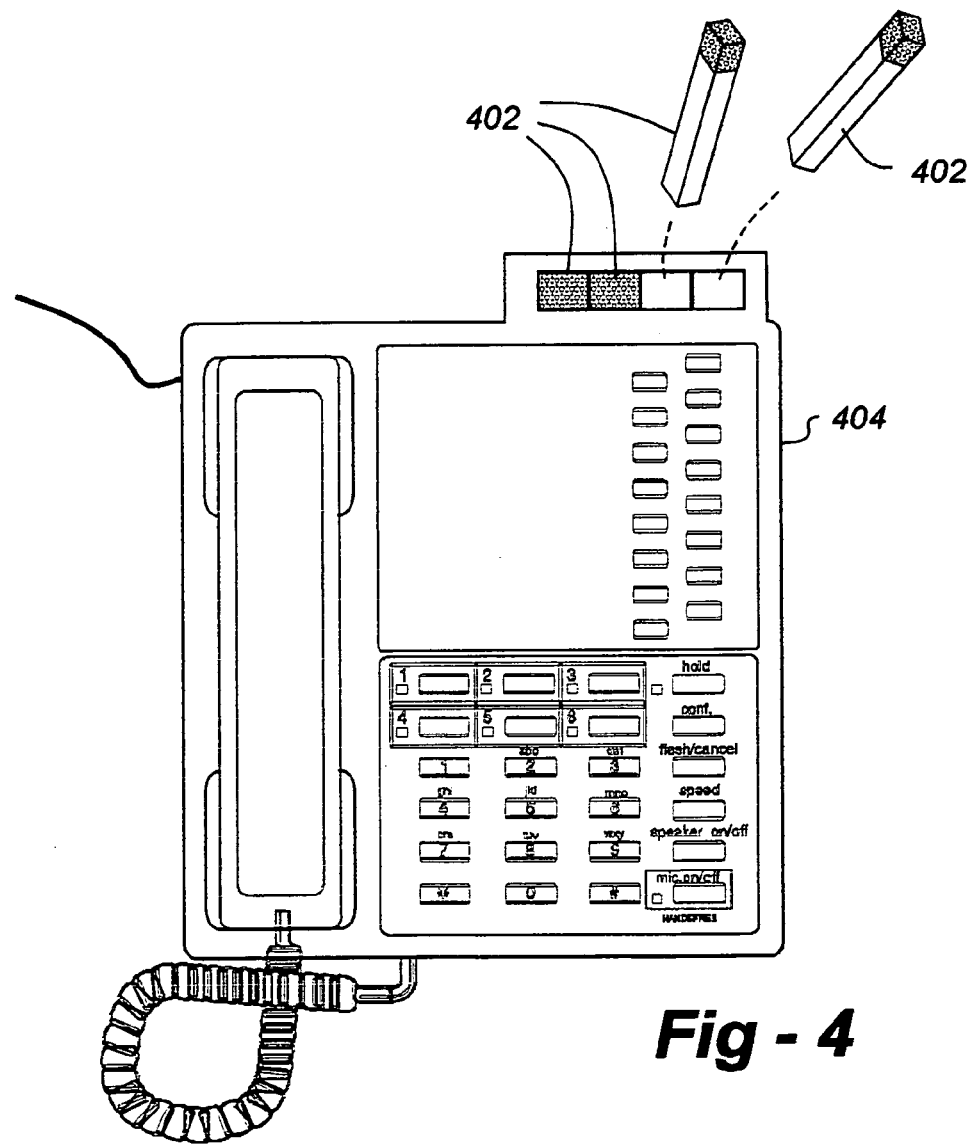
FIG. 4 is a drawing of a telephone-based embodiment of the invention including a docking station to receive a wireless microphone.

FIG. 4 is a drawing which shows how multiple remote units may be configured in separate docking stations, much like the single-microphone configuration of FIG. 2. In the case of a multiple microphone configuration, however, each new participant entering into the conference call could simply remove one of the microphones 402 from the base unit 404, and insert it into a pocket, or clip it to a lapel, after which time their audio would be heard at the remote location.

Figure 5:
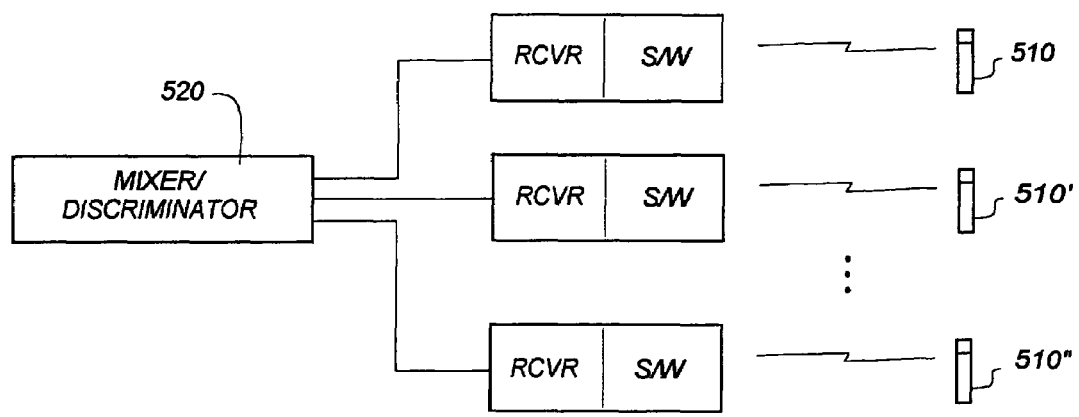
FIG. 5 is a block diagram of an embodiment of the invention utilizing multiple wireless microphones.

FIG. 5 is a block diagram of a telecommunications system according to the invention including multiple remote microphones, 510, 510', 510", and so on. As in other embodiments disclosed herein, each remote microphone 510 would preferably interact with a switch means (S/W) such that removal of remote microphone would inform the base unit that another remote has become active. In the case of multiple receivers on different carrier frequencies, such activation would, at the least, cause the corresponding receiver to begin receiving remote signals from the microphone, or, in the case of packetized transmissions on a common carrier frequency, would cause mixer/discriminator block 520 to begin selective reception from the new participant.

Figure 6:
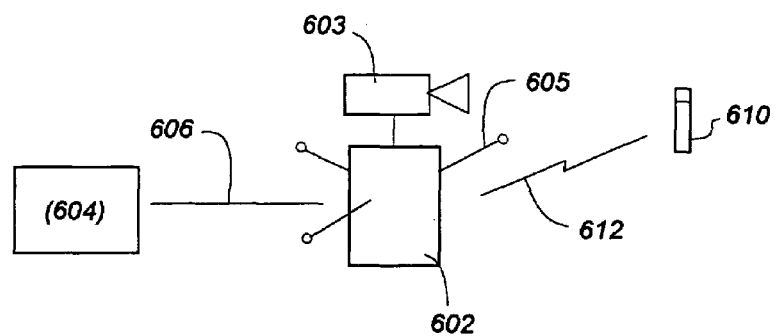
FIG. 6 is a drawing of an embodiment of the invention applicable to video teleconferencing.

The invention is not limited to audio-only telecommunications, but is also applicable to audio/video configurations, wherein additional capabilities are made possible through the teachings herein. FIG. 6, for example, shows a basic video teleconferencing embodiment of the invention, wherein a base unit 602 including a camera 603, oriented to gather a video image of an individual communicating through a remote microphone 610 over wireless path 612. It is presumed that the base unit 602 is in communication with one or more remote participants 604 over any path 606 having a sufficiently high bandwidth.

Whereas the audio received from remote microphone 610 over path 612 may be similar, if not identical, to the audio embodiments described elsewhere herein, the existence of camera 603 as part of a video telecommunications system adds additional capabilities through the use of one or more wireless microphones according to the invention. For example, with appropriate directional antenna 605 associated with the base unit 602, positional aspects of the microphone 610 may be ascertained, allowing the camera 603 to pan and/or zoom to one or more speakers. This basic capability is described in our U.S. Pat. No. 5,995,763, which is incorporated herein by reference. This patent also describes how, through the transmission of inaudible signals from a base unit, the distance to a remote microphone may be determined through time-of-flight ranging, thereby providing an autofocussing functions Although our issued patent describes these techniques in relation to audio/picture recording apparatus, they are equally applicable to the telecommunications apparatus now being disclosed.

Figure 7:
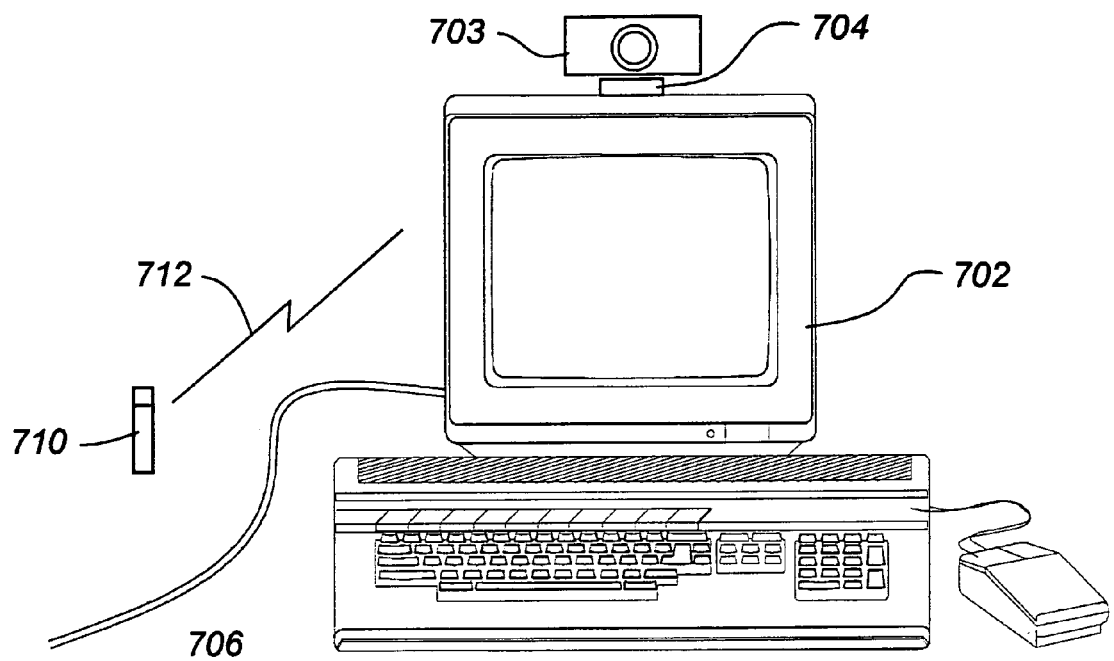
FIG. 7 is a drawing of a personal-computer having a video camera and remote microphone utilizing inventive concepts.

FIG. 7 is a drawing of a hardware configuration which would take advantage of the configuration of FIG. 6. In this case, a base unit 702 is shown in the form of a personal computer, having video camera or web cam 703 with a pan/tilt mount 704. Although a base unit in the form of a desktop computer is being shown, any other base unit is applicable to this or other embodiments of the invention, including telephones with handsets, video telecommunications hardware, personal digital assistance, cellular telephones, and so forth. The remote microphone is shown as 710 in communication with the base unit through a wireless signal 712. The communications path 706 is assumed, again, to be any appropriate form of wired/wireless path having appropriate bandwidth, whether analog or digital, dedicated or packetized, including interfaces utilizing TCP/IP or yet-to-be-developed internet protocols. Thus, in the configuration of FIG. 7, a user carrying remote-microphone 710, would, in a comprehensive implementation, be able to walk around a room, with camera 703 panning, zooming, and focusing on the carrier of the remote unit 710 with the recipient on the other end seeing a clear picture of the speaker, along with quality audio.

It is important to understand that, as used herein, terms such as "pan" and zoom" should be taken to mean both purely mechanical, as well as electronic alternatives not requiring moving parts. That is, as in the case of conventional pan/tilt/zoom mounts, signals derived from remote units according to the invention may cause a camera to physically move from side-to-side, up-and-down, and in-and-out through servomotors or other appropriate linkages. But in addition, particularly in the case where a very high resolution image sensor is used having a field of view greater than a particular field of view of interest, terms such as "pan," "tilt" and "zoom" may be taken to include the selection of subset scenes from larger images without necessarily having to mechanically move any portion of the camera itself. Concepts of this type are becoming more popular with the advent of high-resolution digital cameras, many of which offer a "digital zoom" which simply selects a subset from a greater number of pixels, thereby simulating an optical zoom. This invention extends such concepts to include optional pan/tilt on a selective basis.

Figure 8:
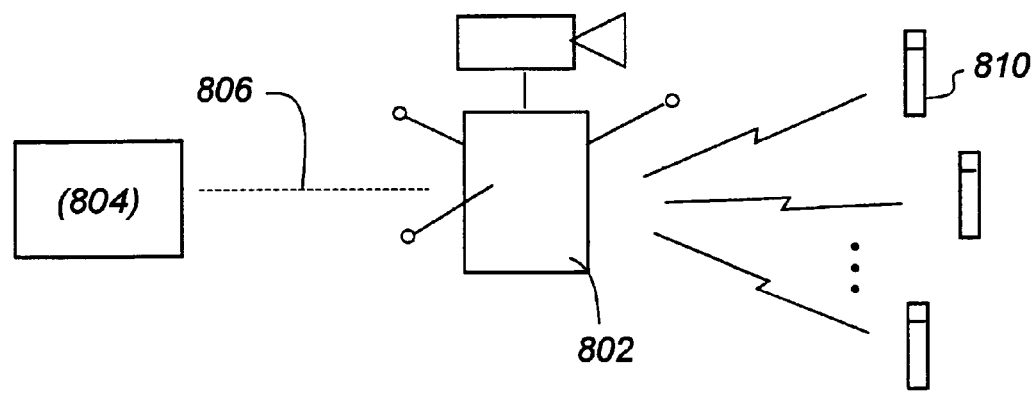
FIG. 8 is a block diagram of a video teleconferencing system according to the invention using a camera controlled using multiple remote units.

The use of selective pan, zoom and/or focus offers certain advantages through the inventive use of multiple remote microphones, as better understood with reference to FIG. 8. In particular, and in the event that a single speaker is talking through microphone 810 with other remote microphones active, may cause the remote unit 802 to pan/tilt and zoom to the speaker associated with remote microphone 810, so that the one or more recipients 804 in communication with the base unit 802 over path 806 see, and hear, only that person while talking. In addition, particularly with the addition of auto-ranging/focusing functions according to the invention, by knowing how far the speaker is from the camera, in conjunction with predetermined criteria associated with proportions appropriate to subject isolation in portraiture, the system may automatically determine the appropriate image guard band placed around the location of a given microphone, to ensure that the speaker using that microphone is singled out and framed for the greatest clarity, much as a human operator would attempt to achieve. In other words, in the embodiment of the invention utilizing a full complement of pan/tilt/zoom and auto-focusing capabilities, a particular speaker may be singled out, not only in terms of audio reception, but the speaker may also be automatically focused and framed in terms of pan/tilt/zoom capabilities.

Figure 9:
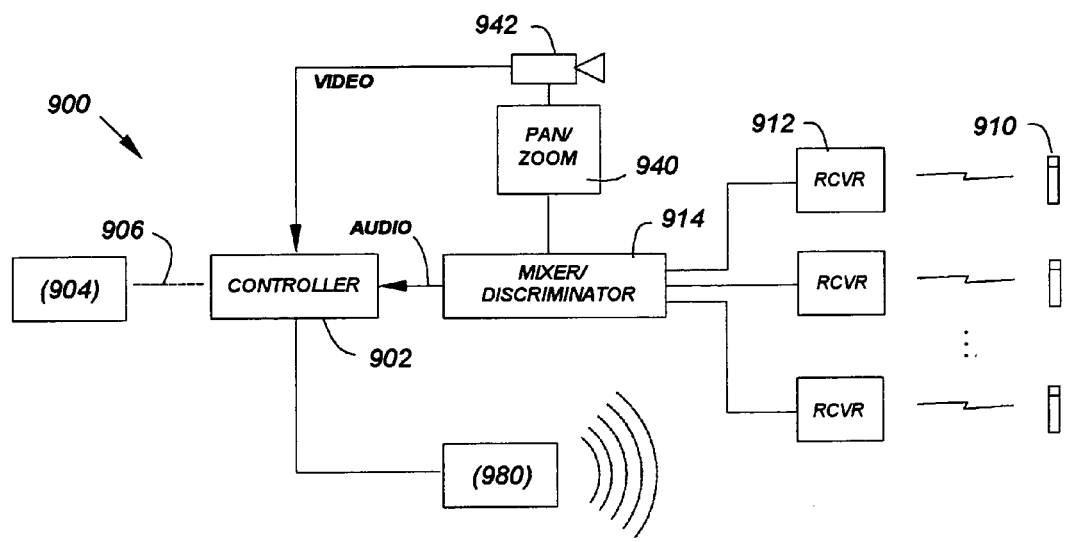
FIG. 9 is a block diagram of a video teleconferencing system using multiple remote microphones and a wireless signal which is transponded to determine the distance to each remote unit based upon time-of-flight.

FIG. 9 is a simplified block diagram of such a system, wherein remote microphones communicate to a base unit 900 through one or more receivers 912. Depending upon whether separate carrier frequencies or packetized microphone identification schemes are used, the discriminator/mixer unit 914 is responsible for delivering audio to a controller and transceiver block 902 for two-way communications with one or more remote recipients 904 or path 906. A pan/tilt/zoom block 940 is responsible for moving the camera 942, or for selecting subimages from a larger scene, in the event that resolution permits pan, tilt, or zoom without the need for physical camera movements. Presumably block 940 includes multiple antennas so that the whereabouts of each remote unit 91 may be determined through triangulation. To realize auto-focusing through time-of-flight, a transmitter 980 is used to transmit a signal to the remote microphones 910 which, once relayed back to the base unit of each microphone functioning as a transponder, distance may be mathematically determined through time delay. As described in our issued U.S. Pat. No. 5,795,763, the transmitter 980 would preferably utilize an inaudible acoustic signal, which could be picked up by each active microphone and relayed back to the base unit for distance determination and auto-focusing function. In fact, given that the unit 914 includes some means for discrimination among microphones, a single series of ultrasonic pulses may be generated by the transmitter 980 and picked up by each microphone, with discriminator electronics being used to determine the distance from each microphone from the base unit, in each case. Although different transmitters for each microphone could alternatively be used for distance measurement, a common source would be more convenient and less expensive to implement.

Figure 10:
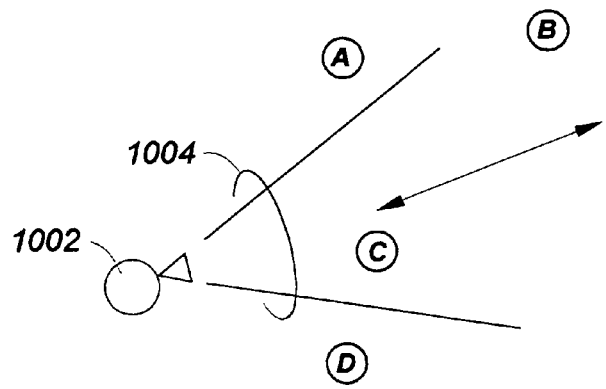
FIG. 10 is a top-down drawing of a portion of a video teleconferencing system used to show how a camera may be adjusted in terms of pan, tilt, zoom, focus and depth-of-field with respect to multiple microphone holders.

With the base unit according to the invention being able to determine where each activated remote microphone is located in three-dimensional space, in a video teleconferencing embodiment of the invention, camera pan/tilt/zoom and focusing functions may be tailored for multiple speakers, as discussed above. As shown in FIG. 10, for example, it is assumed that four speakers, A, B, C and D, carry active microphones as part of a video teleconferencing arrangement, but that only speakers B and C are speaking at a particular time. According to the invention, this may cause camera 1002 not only to pan and tilt to ensure that speakers B and C are within the field of view 1004, assuming appropriate visual guard bands, but in addition, with distance being known, the camera 1002 may also be adjusted in terms of depth-of-field to ensure that one or more speakers are also in focus.

To allow time for the audio and pan/scan circuitry to respond to changes in the speaker or location of the speaker, the system may employ both audio and video time-compression facilities. As an example, the type of time-compression circuitry employed with audio signals for speech compression of radio broadcasts, or for television broadcasts to adjust the length of movies to fit in a shortened or lengthened time-slot, may also be utilized with these teleconferencing systems. If multiple cameras are employed, the video-delay system would allow the detection of a change in the speakers, and therefore allow a switch to a different camera with an improved "camera angle." The delay system would allow this switch to be performed seamlessly. A similar application of time-delay circuitry to the audio side would enable the microphones to be switched accordingly. In either case, the effectiveness of these techniques would rely on signal buffers to implement appropriate delays.

In an alternative embodiment, the systems disclosed with reference to FIGS. 2 and 10 may be combined, by utilizing the bidirectional communication between the base unit and the remote microphone units to signal the wearer of the microphone that he is approaching the edge of the area that is covered by the camera. This warning, which could be audible, visible, or silent, would contribute to the current system, which allows the participants to interact with the cameras and microphones in a manner which maximizes the effectiveness of the coverage.

In yet a further embodiment, a conferencing participant may be located in an automobile or other mobile remote site. In this case, the vehicle would be equipped with a "holster" or "receptacle" facility, in which a cellular telephone or portion of a cellular phone could be inserted. By "portion" it is meant that the user device may only contain a microphone, speaker, and modulated audio transceiver. For example, in a vehicular application, and infrared or dedicated RF carrier may be used.

In practice, the receptacle adapted to receive the user device could be formed from plastic or foam materials, and could further include microphone and speaker facilities which were designed to interface with the receiver and transmitter facilities, respectively, of the cellular telephone; a power supply interface would also be provided. These facilities would allow interfacing with microphones and speakers within the mobile environment, which would serve the purpose provided by the base units of the previous descriptions.

Since various types of portable communication devices are designed to fit comfortably next to the human face of the average user, the receptacle device would easily interface with these types of portable communication devices. To improve the reception of audio within the mobile environment, noise-canceling technology may be employed, preferably by utilizing an audio pickup of environmental noise to produce phase-reversed signals that are of the proper amplitude and frequency spectrum to cancel the that of the ambient environment.

We claim:

1. Telecommunications apparatus, comprising:
   a base unit including an interface to a telecommunications network;
   at least one wireless remote microphone in wireless communication with the base unit, enabling a user of the microphone to speak to a listener through the base unit and telecommunications network,
   the base unit forming part of a video teleconferencing system including a video camera for capturing images of the user for transmission to the listener through the telecommunications network;
   a wireless locator signal transmitter located at the base unit;
   the remote microphone being configured to receive and re-transmit the locator signal to the base unit, enabling the base unit to determine a positional aspect of the user of the microphone; and
   a pan or tilt capability associated with the video camera which is controlled as a function of the positional aspect, enabling the video camera to visually track a moving user.

2. The telecommunications apparatus of claim 1, further including:
   an auto-focusing capability for the video camera which is controlled as a function of the positional aspect.

3. The telecommunications apparatus of claim 1, further including:
   a zoom lens associated with the video camera which is controlled as a function of the positional aspect.

4. The telecommunications apparatus of claim 1, further including:
   a plurality of wireless remote microphones, each re-transmitting the locator signal to the base unit; and
   circuitry for distinguishing the signals received by each microphone so that the camera tracks a particular user when that user is speaking.

5. The telecommunications apparatus of claim 4, further including:
   a plurality of wireless locator signal transmitters; and
   wherein each remote microphone re-transmits one of the locator signals to the base unit, enabling the base unit to determine a positional aspect of each user.

6. The telecommunications apparatus of claim 5, further including:
   a pan, tilt, or zoom capability associated with the video camera which is controlled as function of the positional aspect of each user.

7. The telecommunications apparatus of claim 6, wherein the pan, tilt, or zoom capabilities are effectuated by selecting a subset of pixels from a larger number of pixels in an image gathered by the camera.

8. The telecommunications apparatus of claim 5, further including:
   an auto-focusing capability for the video camera which is controlled as a function of the positional aspect of each user, enabling the camera to control depth-of-field associated with one or more users.

9. The telecommunications apparatus of claim 1, wherein the wireless signal transmitter located at the base unit transmits an inaudible acoustic signal.

10. The telecommunications apparatus of claim 4, wherein the circuitry for distinguishing the signals received by each microphone so that the camera follows a particular user includes a different carrier frequency associated with each microphone.

11. The telecommunications apparatus of claim 4, wherein the circuitry for distinguishing the signals received by each microphone includes microphone identification circuitry located at the base unit.

12. The telecommunications apparatus of claim 1, further including circuitry for:
   evaluating signal quality from the microphone; and
   a activating an alarm if the signal quality indicates that the microphone is being carried away by the user.

* * * * *